United States Patent [19]

Rabotski

[11] Patent Number: 4,598,446
[45] Date of Patent: Jul. 8, 1986

[54] MACHINE FOR STAKING CAN LEADS
[75] Inventor: John Rabotski, Sheboygan, Wis.
[73] Assignee: Summit Corporation of America, Thomaston, Conn.
[21] Appl. No.: 654,416
[22] Filed: Sep. 26, 1984
[51] Int. Cl.[4] ............................................. B23Q 7/02
[52] U.S. Cl. .................................. 29/34 R; 29/38 C; 29/564.1; 29/845
[58] Field of Search ................... 29/34 R, 564, 564.1, 29/564.2, 38 C, 838, 761, 845, 796, 861, 788, 865, 563; 72/311, 404

[56] References Cited

U.S. PATENT DOCUMENTS

| Re. 7,167 | 6/1876 | Clark . | |
|---|---|---|---|
| 59,464 | 11/1866 | Seward . | |
| 96,308 | 11/1869 | Clark . | |
| 172,081 | 1/1876 | Browning . | |
| 316,650 | 4/1885 | Perkins . | |
| 329,336 | 10/1885 | Platt . | |
| 330,962 | 11/1885 | Davis et al. . | |
| 361,952 | 4/1887 | Little . | |
| 373,891 | 11/1887 | Hall . | |
| 376,673 | 1/1888 | Mutimer . | |
| 378,936 | 3/1888 | Mutimer . | |
| 551,790 | 12/1895 | Savory | 29/745 |
| 554,836 | 2/1896 | Savory | 29/243.54 |
| 760,220 | 5/1904 | Loss | 72/325 |
| 1,084,218 | 1/1914 | Mayo . | |
| 1,149,737 | 8/1915 | Dedrick . | |
| 1,382,052 | 6/1921 | Birrell . | |
| 1,415,745 | 5/1922 | Washburne . | |
| 1,674,318 | 6/1928 | Carr . | |
| 1,688,423 | 10/1928 | Jardine . | |
| 1,900,099 | 3/1933 | Ferguson | 29/845 |
| 1,905,084 | 4/1933 | Fieq . | |
| 1,932,296 | 10/1933 | Clouse . | |
| 1,990,819 | 2/1935 | Danziger . | |
| 2,001,981 | 5/1935 | Siviter . | |
| 2,303,780 | 12/1942 | Wilcox . | |
| 2,305,049 | 12/1942 | Wilcox . | |
| 2,401,329 | 6/1946 | Blaisdell . | |
| 2,433,373 | 12/1947 | Krim . | |
| 2,436,019 | 2/1948 | Rosendale . | |
| 2,515,881 | 7/1950 | Makenni | 29/845 |
| 2,643,403 | 6/1953 | MacBlane et al. | 29/38 C |
| 2,753,624 | 7/1956 | Taylor . | |
| 2,768,763 | 10/1956 | Meilstrup . | |
| 2,805,372 | 9/1957 | Schneider . | |
| 2,856,801 | 10/1958 | Griswold | 29/38 C |
| 2,924,870 | 1/1960 | Boisjolie . | |
| 2,957,237 | 10/1960 | Regle et al. . | |
| 2,964,902 | 12/1960 | Carlton et al. . | |
| 2,987,752 | 6/1961 | Black . | |
| 3,061,760 | 10/1962 | Ezzo | 29/832 |
| 3,126,561 | 3/1964 | Orloff . | |
| 3,188,849 | 5/1965 | Wisebaker et al. | 72/346 |
| 3,195,027 | 7/1965 | Vandermark et al. | 317/242 |
| 3,233,028 | 1/1966 | Toppari et al. | 264/272 |
| 3,264,860 | 8/1966 | Herb | 72/457 |
| 3,281,823 | 11/1966 | Best et al. | 29/155.5 |
| 3,380,142 | 4/1968 | Wilens et al. | 29/34 R |

FOREIGN PATENT DOCUMENTS

| 100307 | 2/1984 | European Pat. Off. | 29/564.1 |
|---|---|---|---|
| 1120022 | 12/1961 | Fed. Rep. of Germany | 29/563 |
| 758254 | 10/1956 | United Kingdom | 29/564 |
| 847381 | 9/1960 | United Kingdom | 29/563 |

Primary Examiner—William R. Briggs
Attorney, Agent, or Firm—Andrus, Sceales, Starke & Sawall

[57] ABSTRACT

A machine for attaching wire leads to cans for housing electrical components. The machine includes a plurality of split dies mounted on the spokes of a rotatable spindle for receiving and holding wire leads, and an index drive for rotatably indexing the spindle and split dies to a plurality of work stations, including a wire feed station, a wire upsetting station, a can staking station and a discharge station. At the wire feed station, a plurality of reciprocating plungers feed wire leads of predetermined length to the split dies so that one end of the wires project from the face of the split dies. At the wire upsetting station, a plurality of reciprocating punches upset and head the wire leads at a location spaced from their ends while at the can staking station a plurality of reciprocating punches feed cans having bottom holes over the headed ends of the wire leads as far as the heads and stake the ends of the wire leads to attach the leads to the cans. The machine also includes a wire straightener, a wire cutter and a wire magazine for supplying wire leads between the plungers and split dies at the wire feed station.

19 Claims, 13 Drawing Figures

MACHINE FOR STAKING CAN LEADS

BACKGROUND OF THE INVENTION

The present invention relates to the manufacture of cans for housing electronic components, and more particularly to a machine for attaching wire leads to the cans.

Electronic components such as capacitors are frequently housed in drawn metal cans having a short wire lead attached thereto. The wire lead may be soldered or welded to the metal can, or as shown in Wilens et al, U.S. Pat. No. 3,380,142 may be staked in a hole in the bottom of the can. The machine described in the Wilens et al patent, however, is relatively slow in operation, and thus it is desired to provide a machine that increases the production of such cans and is fully automatic in operation.

Other methods and apparatus for attaching wire leads to electrical components are also known. For example, British Pat. No. 847,381 relates to an electrolytic condenser having a rod-like anode riser sealingly connected to the insulating end cover of a condenser can. Best et al, U.S. Pat. No. 3,281,923 relates to a method of attaching a terminal wire or lead to thin film electrical circuits which may include electrical components such as capacitors, transistors, or the like. As shown therein, the headed end of a terminal wire or lead is riveted or staked to thin film circuity by a pair of dies applying a force to the lead along its longitudinal axis. Savory, U.S. Pat. No. 554,836 describes a device for connecting a small electric conductor or wire to an electrical component by upsetting or staking the wire within a hole formed in the component.

Upsetting or heading techniques for cold working wire or other types of longitudinal metal parts are well-known in the art. For example, Toppari et al, U.S. Pat. No. 3,233,028 shows lead wires staked to end caps of a capacitor. Little, U.S. Pat. No. 361,952 shows a method of staking a spoke to the rim of a metal wheel. Birrell, U.S. Pat. No. 1,382,052, Washburne, U.S. Pat. No. 1,415,745 and Jardine, U.S. Pat. No. 1,688,423 each show methods and apparatuses for staking stems to the heads of valve members. Similarly, Black, U.S. Pat. No. 2,987,752 shows the use of an upsetting process to attach a spindle to a yoke of a caster, and Wisebaker et al, U.S. Pat. No. 3,188,849 shows a method and apparatus for multiple upsetting of a metal blank to form spark pulg studs.

SUMMARY OF THE INVENTION

A machine for attaching wire leads to cans for housing electrical components. The machine includes holding means mounted for rotation about an axis for receiving and holding a wire lead, and indexing means for rotatably indexing the holding means to a plurality of work stations. Reciprocating first punch means at one of the work stations upsets or heads the wire lead at a location spaced from its end, and reciprocating second punch means at another work station feeds a can having a bottom hole over the headed end of the wire lead as far as the head and stakes the end of the wire lead to attach the lead to the can. Release means releases the holding means to discharge the can and attached wire lead as yet another work station.

The holding means is preferably a split die that acts as a clamp to receive and hold a wire lead so that an end of the wire projects from the face of the die. The heading and can staking operations may thus be readily performed. Preferably, there are a plurality of split dies mounted on the ends of spokes of a pair of rotatable spindles so that increased production rates may be obtained.

The machine also includes reciprocating plunger means at one of the work stations for feeding wire leads to the holding means, and means for supplying wire leads of predetermined length between the plunger means and the holding means. This latter means may include wire straighting means that feeds wire from a reel of continuous wire to a cutter means which cuts the continuous wire to the desired length, and a wire magazine positioned between the plunger means and the holding means that properly locates the cut wire leads in a position whereby the plunger means may feed the cut wire leads to the holding means. The machine also includes a can magazine between the second punch means and the holding means for supplying cans in the proper orientation so that they may be placed over the ends of the wires by the second punch means.

The present invention thus provides an improved machine for attaching wire leads to cans which is efficient, increases production and is fully automatic in operation.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 12:
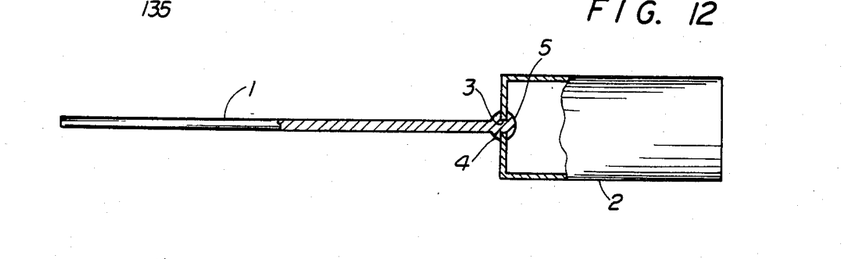
FIG. 12 is a detailed view with parts broken away and in section of a can and wire lead attached thereto by the machine of FIG. 1.

Referring now to the drawings, and particularly to FIG. 12, there is illustrated a machine for attaching wire leads 1 to a drawn sheet metal can 2. The can may be made of any suitable material such as brass and may be about 5 1/16" in diameter and ¾" long. Can 2 has a hole 3 in the center of its bottom to receive one end of wire. The present machine severs a lead wire 1 from a reel of continuous wire, and first upsets or heads wire 1 a short distance from its end as indicated at 4. Wire 1 is then riveted or staked against the inside bottom of can 2 as indicated at 5 to thereby securely attach wire lead 1 to can 2 with the can bottom tightly held between head 4 and staked end 5.

Figure 1:
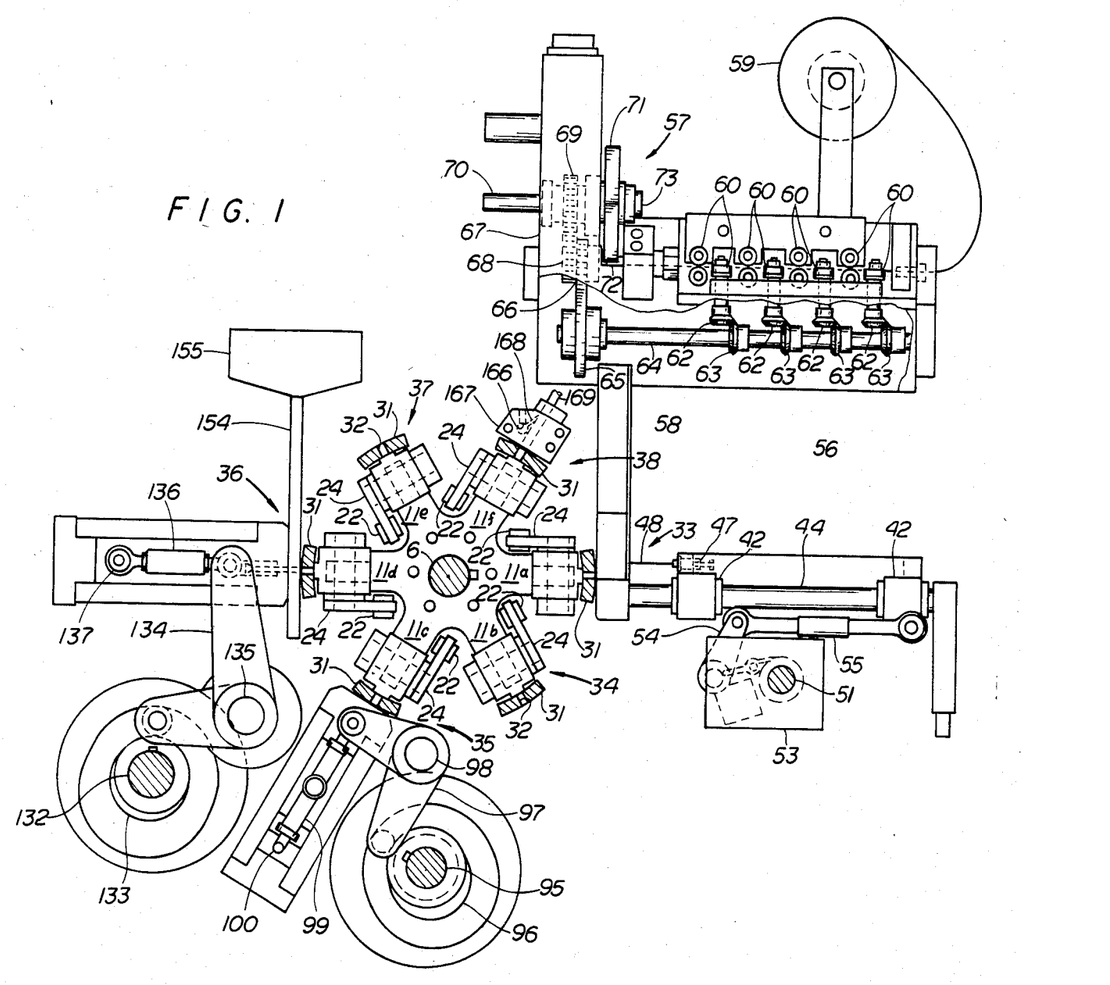
FIG. 1 is a schematic side view in elevation with parts broken away illustrating a machine for attaching wire leads to cans constructed in accordance with the principles of the present invention.
Figure 2:
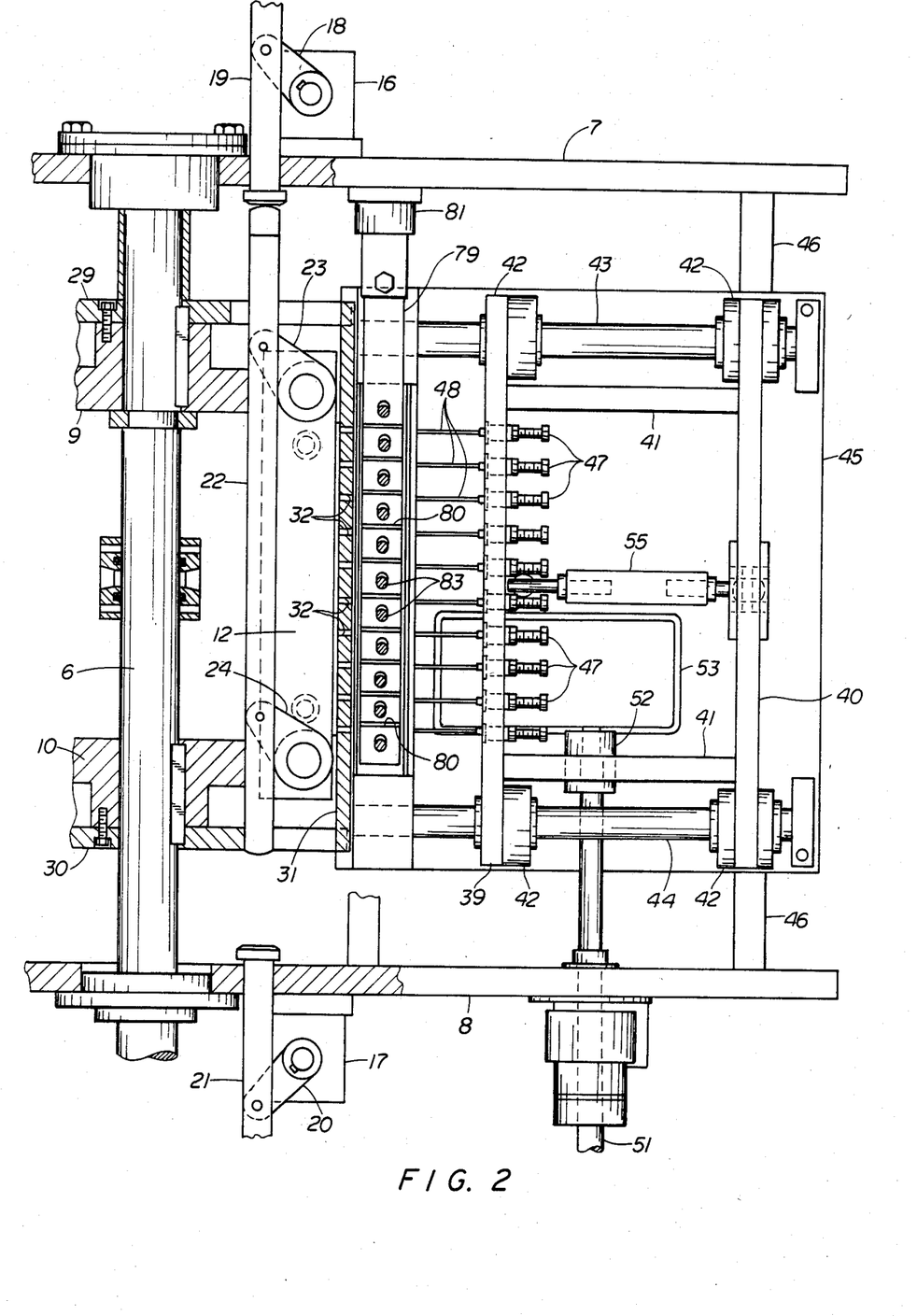
FIG. 2 is a top plan view partially in section of the wire feed station of the machine of FIG. 1.

Referring now to FIGS. 1 and 2, the machine includes a main shaft 6 journalled for rotation in a pair of opposite end walls 7 and 8. A pair of spaced apart spindles 9 and 10 are keyed to shaft 6 for rotation therewith and are located at opposite ends thereof adjacent walls 7 and 8. Each spindle 9 and 10 includes six spokes 11a-11f projecting outwardly from a central hub and equiangularly spaced apart from one another. A split die composed of an upper clamping plate 12 and a lower clamping plate 13 (See FIG. 4) is mounted on the end of each spoke 11a-11f and extends between spindles 9 and 10. Plates 12 and 13 each include ten spaced apart semi-cylindrical grooves 14 and 15 formed therein which mate when plates 12 and 13 are clamped together to form an opening having a diameter slightly less than the diameter of wire leads 1. Thus, when plates 12 and 13 are moved together they act as a clamp to receive and hold wire leads 1.

Figure 4:
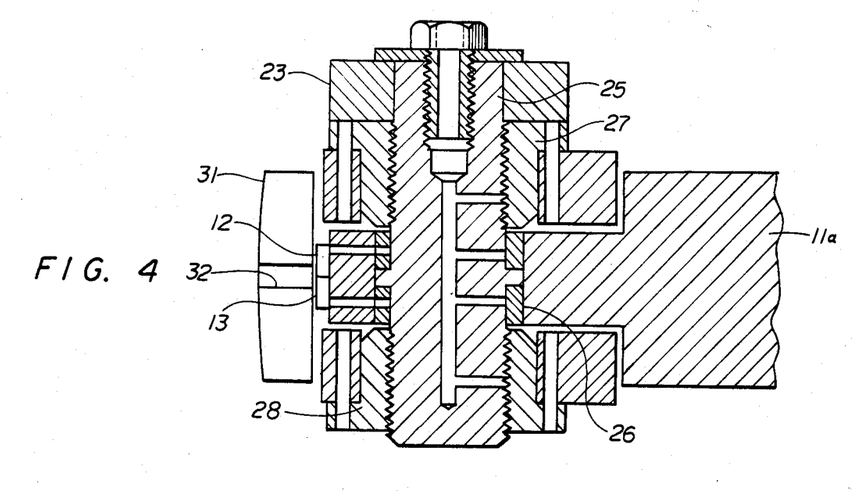
FIG. 4 is a detailed sectional view showing a split die for receiving and holding the wire leads.
Figure 5:
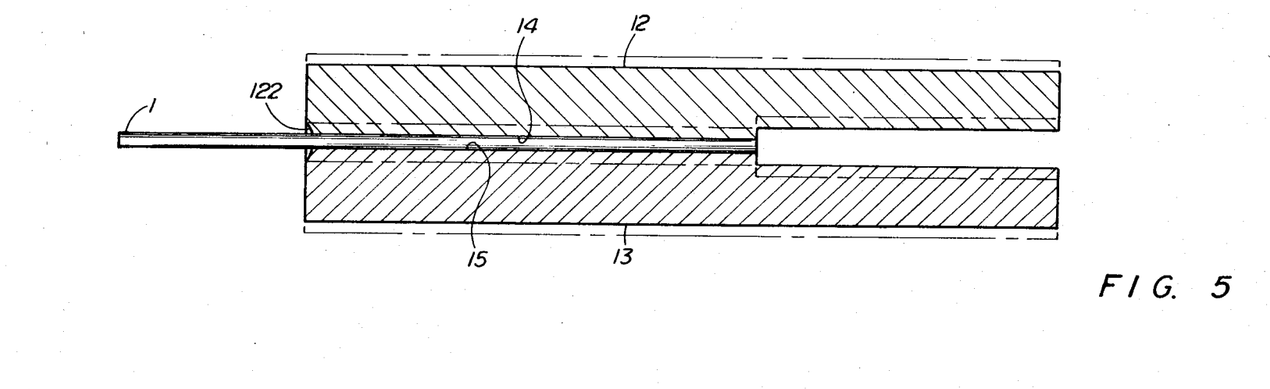
FIG. 5 is a cross sectional detail view showing the clamping plates of the split due of FIG. 4.

In order to open or release plates 12 and 13 and close or clamp plates 12 and 13 a pair of rotary actuators 16 and 17 are mounted on end walls 7 and 8, respectively. Rotary actuator 16 rotates a link 18 which in turn is pivotally connected to an actuator rod 19 which projects through end wall 7. Rotary actuator 17 is identical and includes a link 20 pivotally mounted to an actuator rod 21 which extends through end wall 8. Actuator rods 19 and 21 may be aligned with six bars 22 which are mounted respectively on the sides of spokes 11a-11f. Each bar 22 in turn is pivotally connected to a pair of levers 23 and 24. Referring now to FIG. 4, the operation of lever 23 will now be described it being understood that lever 24 operates in an identical manner. Lever 23 is fixedly connected to a pivot pin 25 having threaded upper and lower ends which in turn is pivotally mounted in a bushing 26 located respectively at the outer ends of spokes 11a-11f. Upper clamp plate 12 is connected to a jaw bushing 27 having right hand threads engaged with the upper threaded portion of pin 25 while lower clamp plate 13 is connected to a second jaw bushing 28 having left hand threads engaged with the threaded lower portion of pin 25. Thus, assuming that the split die is initially closed in the position shown in FIG. 2, in order to open or release each split die rod 22 is moved downwardly by rotary actuator 16 to pivot levers 23 and 24 and pins 25 so that jaw bushing 27 moves upwardly and jaw bushing 28 moves downwardly to open or release clamp plates 12 and 13. To close or clamp each split die, the reverse operation occurs so that rotary actuator 17 moves rod 22 back to the position shown in FIG. 2 to thereby pivot levers 23 and 24 and pivot pins 25 so that jaw bushing 27 moves downwardly and jaw bushing 28 moves upwardly to close clamp plates 12 and 13.

A pair of circular end plates 29 and 30 are bolted to the hubs of spindles 9 and 10 respectively to close off opposite ends thereof. Six plates 31 extend between end plates 29 and 30 substantially in alignment with the ends of the six spokes 11a-11f of spindles 9 and 10. Each plate 31 includes ten spaced apart cylindrical openings 32 formed therethrough. The longitudinal axis of each opening 12 is substantially aligned with the longitudinal axis of grooves 14 and 15 formed in clamp plates 12 and 13 when closed.

Each of the six split dies mounted on spokes 11a-11f of spindles 9 and 8 are rotated to six discrete individual positions about the longitudinal axis of shaft 6 by an indexing means, as well hereinafter be described. A shown best in FIG. 1, these positions include four work stations where the wire feeding, wire heading or upsetting, can staking and can discharge operations occur, and two idle stations where no work is performed on either wire 1 or can 2. As best shown in FIG. 1, and assuming shaft 6 rotates clockwise spoke 11a is shown in the first position i.e. a wire feed station generally designated by the numeral 33. After the wire leads 1 are fed to the split dies at station 33 shaft 6 is rotated clockwise so that spoke 11a is moved to the second position or idle station generally designated by the numeral 34. From idle station 34 the split die with the wires 1 projecting therefrom on spoke 11a is then rotated to a third position where the wire leads 1 are upset or headed a short distance from their ends at a wire upsetting station generally designated by the numeral 35. After wires 1 are headed, spoke 11a is rotated to a fourth position or can staking station, generally designed by the numeral 36. At the can staking station 36 cans 2 are fed in the direction of wire leads 1 to place the bottom hole 3 over the headed ends of wires 1 as far as head 4 and stake or rivet the ends of wires 1 to securely attach wires 1 to cans 2. Following can staking, cans 2 with the wires 1 now attached are rotated to a fifth position or idle station generally designated by the numeral 37. Finally, cans 2 and attaches wires 1 on spoke 11a are rotated to a sixth position or can discharge station generally designated by the numeral 38. At station 38, the split dies are opened or released and the cans 2 with their attached wire leads 1 are discharged for packaging.

Figure 3:
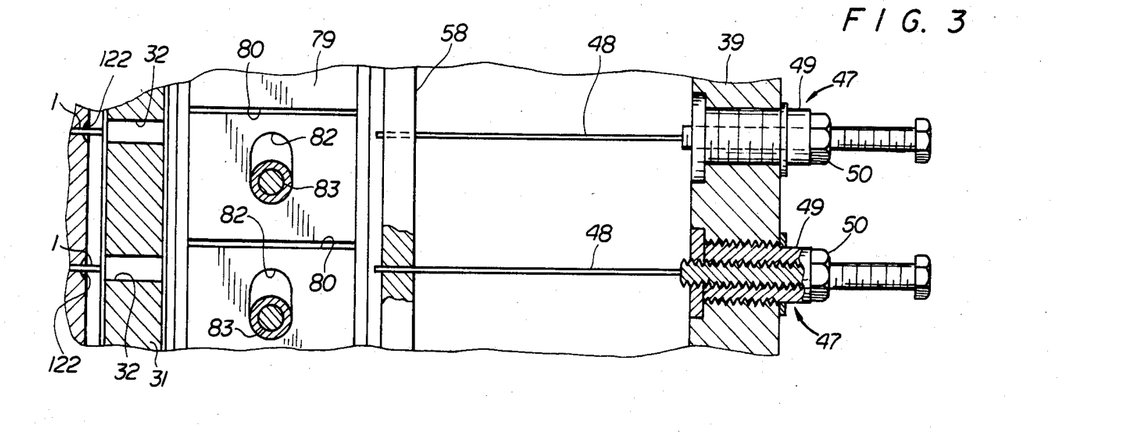
FIG. 3 is a fragmentary detailed plan view partially in section showing two of the wires feed plungers.

Referring now to FIGS. 2 and 3, wire feed station 33 includes a reciprocating wire feed carriage having a front plate 39 and a rear plate 40 spaced therefrom and connected therewith by means of a pair of struts 41 at opposite ends of plates 39 and 40. Each end of plates 39 and 40 is mounted by bearings 42 for sliding movement on a pair of shafts 43 and 44. Shafts 43 and 44 in turn are mounted on a support 45 which is connected to end walls 7 and 8 by struts 46. Front plate 39 includes ten wire feed plungers 47 mounted thereon. Each plunger 47 includes a finger member 48 threadedly engages at its rearward end in a finger guide 49 which in turn is threadedly engaged in front plate 39. The position of finger members 48 may be altered and locked in place by loosening and tightening respectively a lock nut 50. As shown best in FIG. 3, each finger member 48 includes a threaded end and an elongate end projecting forwardly of front plate 39. The longitudinal axis of each finger member 48 is aligned with the longitudinal axis of openings 32 in plates 31 as well as wire leads 1 when locked in position by clamping plates 12 and 13 of the split dies.

In order to reciprocate the wire feed carriage to move plungers 47 between a first position spaced from the split dies and a second wire feed position, a drive shaft 51 journalled in end wall 8 is connected via coupler 52 to an index box 53. Index box 53 may be a commercially available product such as that available from the Commercial Cam and Machine Company. As shown best in FIG. 1, index box 53 pivots a link 54 which is connected at its outer end to a wire feed adjustment link 55 which in turn is connected to rear plate 40. Thus, wire feed plungers 47 may be reciprocally moves so that each time they are moved to their wire feed positions ten wire leads 1 are fed through openings 32 in plates 31 and between clamp plates 12 and 13 of the split die which have been opened in timed relation to the forward movement of plungers 47. Upon the retreat of plungers 47, clamp plates 12 and 13 are closed as hereinbefore described.

As a means for supplying wire leads 1 of predetermined length between plungers 47 and the split dies each time plungers move to their wire feed positions, the machine includes a wire straightening mechanism generally designated by the numeral 56, a wire cutting mechanism generally designated by the numeral 57 and a wire magazine generally designated by the numeral 58. Continuous wire from a source such a reel 59 is supplied to wire straightening mechanism 56 which comprises eight pairs of rollers 60. As shown in FIG. 1, alternating pairs of rollers 60 are disposed 90° from one another so that wire from reel 59 passes through the nips formed therebetween to be straightened. Rollers 60 are mounted on shafts 61 having a plurality of bevel gears 62 thereon which mesh with a like number of bevel gears 63 affixed to a drive shaft 64. Drive shaft 64 is itself driven by a gear 65 meshing with a pinion gear 66 in a gear box 67. Pinion gear 66 is driven by another gear 68 which in turn is driven by pinion gear 69 affixed to drive shaft 70.

After being straightened, the continuous wire is fed to a rotating cutter 71 mounted on shaft 70. Cutter 71 includes a blade 72 on its circumference which cuts the wire as it exits from guide member 73. The length of wire leads 1 can be adjusted by controlling the speed at which rollers 60 are driven, and/or the speed of rotation of cutter 71.

Figure 6:
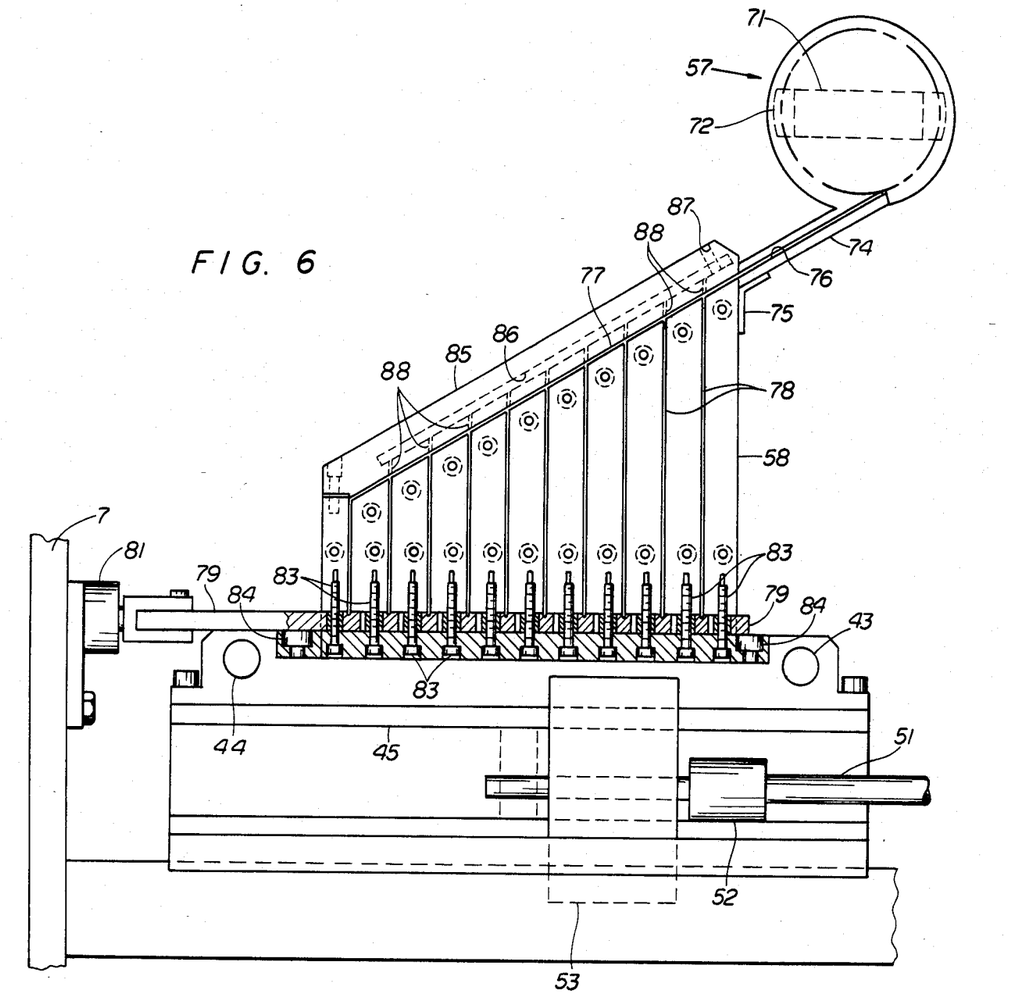
FIG. 6 is a side view in elevation partially in section showing the wire magazine for supplying wire leads to the wire feed station shown in FIG. 2.

After being cut, wire leads 1 fall into a chute 74 (see FIG. 6) and roll downwardly by gravity to wire magazine 58. Chute 74 is supported on magazine 58 by a bracket 75, and includes a downwardly sloping groove dimensioned to receive and permit rolling downward movement for the short wire leads 1. Groove 76 communicates with a main feed groove 77 formed in the upper end of wire magazine 58. Groove 77 also slopes downwardly and is dimensioned similar to groove 76 to permit downward rolling movement for wire leads 1. Groove 77 communicates with ten spaced apart distribution grooves 78 which extend vertically downwardly from groove 77 to a reciprocating wire feed plate 79. Plate 79 is slidably mounted within the lower end of magazine 58 and includes 10 wire receiving grooves 80 formed therein (see also FIGS. 2 and 3). Wire feed plate 79 is reciprocated by a pancake cylinder 81 mounted to end wall 7 and is movable between a first position wherein grooves 80 are aligned with distribution grooves 78 to receive wire leads 1 and a second position where grooves 80 are aligned with fingers 48 of plungers 47 and openings 32 in plates 31. Movement of wire feed plate 79 is in timed relation to the reciprocating movement of plungers 47 so that when plate 79 is in its latter position, or wire feed position, fingers 48 may push wire leads 1 in grooves 80 through openings 32 in plates 31 and between clamp plates 12 and 13 which are also open at this point in time. The sliding movement of wire feed plate 7 is limited by the engagement between a plurality of openings 82 located between adjacent grooves 80 that slidably engage a plurality of bolts 83 that extend between the lower and upper portions of magazine 58. Magazine 58 in turn is mounted on support 45 by bolts 84. In order to insure that wire leads 1 roll down groove 77 and drop into grooves 78, magazine 58 includes an air manifold 85 having a longitudinal bore 86 which communicates via inlet 87 with a source of air under pressure and nine outlets 88 which communciate with the first nine distribution grooves 78 in magazine 58. Outlets 88 provide air jets which force wire leads 1 into grooves 78.

Referring now to FIG. 1, after wire leads 1 are fed to the split dies and the split dies are closed, spindles 9 and 10 are rotated clockwise so that the wire leads 1 on spoke 11a are positioned at idle station 34. At this time, additional wire leads 1 are fed to the split die of the previous spoke 11b. Spoke 11a is then rotated from idle station 34 to wire upsetting station 35 and spoke 11b is rotated to idle station 34 while spoke 11c is rotated to wire feed station 33. This indexing process continues as spoke 11a is rotated about shaft 6, and therefore only the position of spoke 11a and its corresponding split die will hereinafter be discussed.

Figure 7:
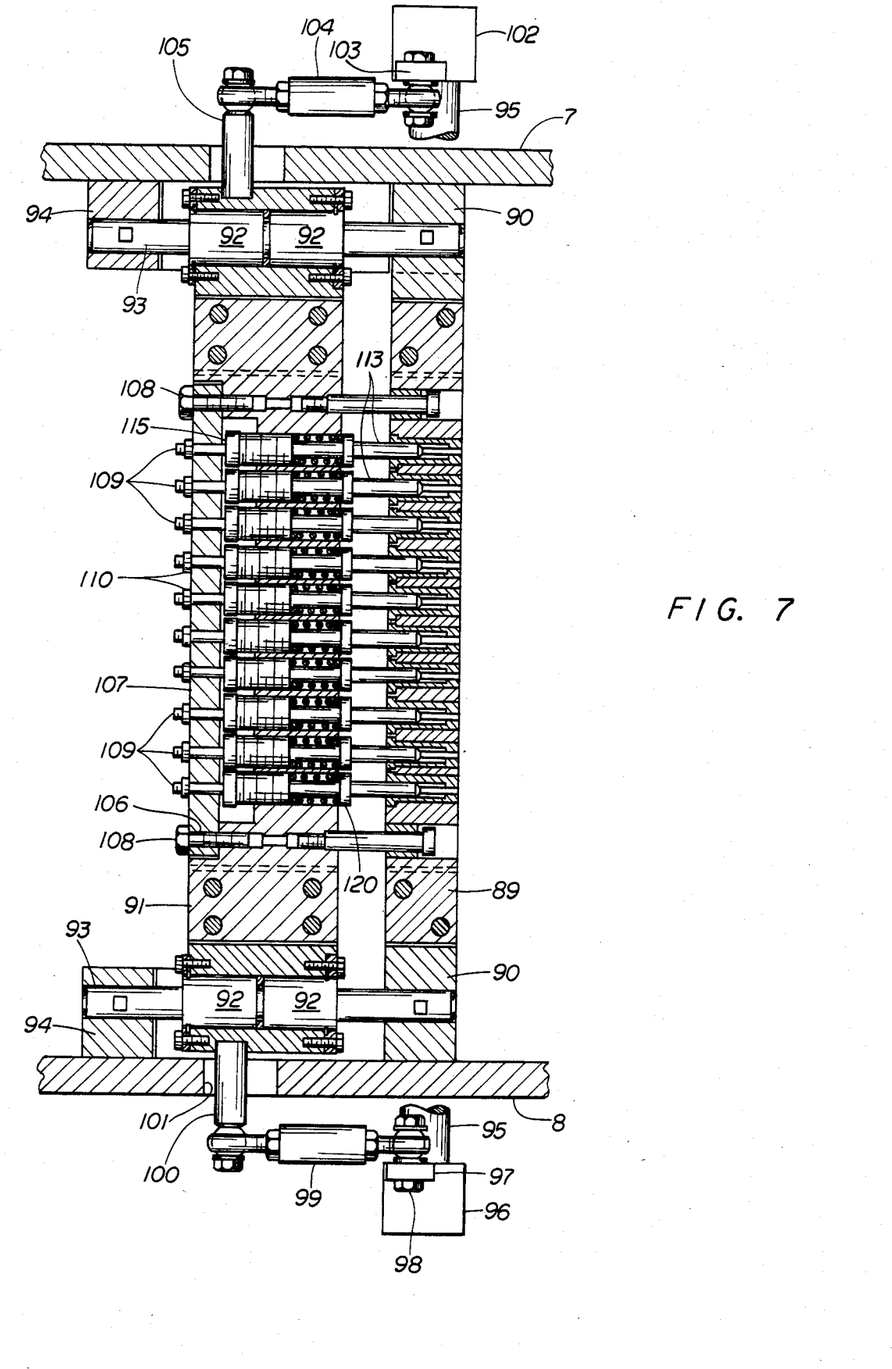
FIG. 7 is a top plan view in section of the wire upsetting station shown in FIG. 1.
Figure 8:
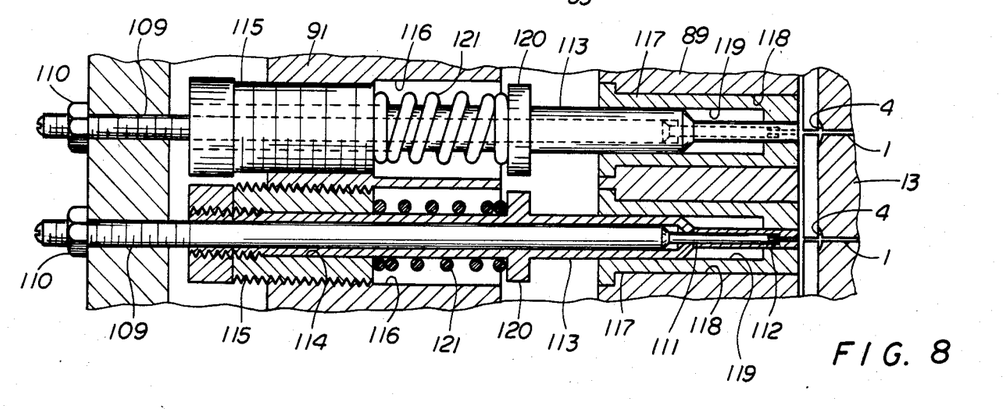
FIG. 8 is a fragmentary detailed view partially in section showing two of the wire upsetting punches.

Referring now to FIGS. 7 and 8, there is shown the various components of wire upsetting station 35 for upsetting or heading wire leads 1 a short distance from their ends. Station 35 includes a stationary guide bar 89 mounted at its opposite ends to a pair of struts 90 which in turn ar fixed to end walls 7 and 8, and a reciprocating carriage 91. Carriage 91 is slidably mounted at its opposite ends by cylinder bearings 92 on a pair of shafts 93 which are supported on end walls 7 and 8 at one end by struts 90 and at their other ends by struts 93. Carriage 91 is reciprocated by means of a shaft 95 keyed to an eccentric 96 which in turn pivots a bell crank lever 97 pivotally mounted at its center as at 98. The end of bell crank 97 is affixed to one end of an adjustable link 99 which in turn has its other end connected to rod 100. Rod 100 in turn projects through an opening 101 in side wall 8 and is affixed to carriage 91. As seen best in FIG. 7, shaft 95 also drives a second eccentric 102 which moves a bell crank 103 in a manner similar to bell crank 97. Bell crank 103 is also connected via an adjustable link 104 to a rod 105 which in turn is connected to the opposite end of carriage 91 in a manner identical to link 99 and rod 100. The movement of bell cranks 97 and 103, however, are in a different timed relationship with respect to one another so that movement of bell crank 97 will move carriage 91 to a wire upsetting position, i.e. next to stationary guide bar 89 whereas movement of bell crank 103 will return carriage 91 to the position shown in FIG. 7, i.e. spaced from guide bar 89.

Carriage 91 includes a U-shaped opening 106 at its rearward end that is closed off by a bar 107 attached to carriage 91 by bolts 108. Ten elongate spaced apart punch members 109 are threadedly engaged at their rearward ends to bar 107 and locked in place by lock nuts 110. The forward ends of punches 109 have a first portion 111 of reduced diameter and a second portion 112 of a further reduced diameter. The smallest portion 112 has a diameter substantially the same as the diameter of wire leads 1. Each punch 109 slides within a punch guide member 113 which has a longitudinal opening 114 having portions of reduced diameter corresponding to portions 111 and 112 of punches 109. The rearward end of each guide member 113 is threadedly engaged to a guide bushing 115 which in turn is threadedly engaged within an opening 116 formed in carriage 91. The forward end of each guide member 113 is slidably received within a guide bushing 117 captured within an opening 118 in stationary guide bar 89. Each guide bushing 117 has a bore 119 formed therethrough having a first portion of a diameter substantially equal to the outer diameter of guide member 113 and a second portion of reduced diameter that is substantially the same as the outer diameter of the forward portion of guide members 113. Each punch guide member 113 includes an annular flange 120 intermediate its ends and a spring 121 that has one of its ends bearing against flange 120 and the other of its ends bearing against guide bushing 115. Spring 121 permits overtravel for carriage 91 as will hereinafter be described. Thus, in order to upset or head wire leads 1 a short distance from their projecting ends, carriage 91 is moved to the right as shown in FIG. 7 so that guide members 113 and punches 109 also move to the right to extend through openings 32 in plate 31 until the forward face of each punch 109 engages the outer end of each wire lead 1. Further movement of carriage 91 to the right forms head 4 on wires 1 since the face of each split die includes a recessed seat 122 to help form the head 4 a short distance from the end of wires 1. Further movement of carriage 91 to the right causes the face of each punch guide number 113 to engage the face of each split die and springs 121 permit slight over travel for carriage 91 to insure the formation of head 4. Carriage 91 is then moved to the left to the position shown in FIG. 7 upon further rotation of shaft 95 by eccentric 102.

Referring now once again to FIG. 1, after wires 1 have been upset or headed at wire upsetting station 35, spoke 11a is rotated to the can staking station 36 where cans 2 are fed over the headed ends of wire leads 1 as far as the heads 4 and staked to the end of wire leads 1 to attach leads 1 to cans 2. More specifically, can staking station 36 includes a stationary guide bar 123 located at its forward end which is bolted at its opposite ends to a pair of struts 124 which in turn are connected to end walls 7 and 8. Guide bar 123 is attached to a support bar 125 spaced rearwardly therefrom by means of a pair of spaced apart braces 126. Support bar 125 in turn is bolted to a pair of struts 127 which in turn are also mounted to end walls 7 and 8. A reciprocating carriage 128 is bolted at its opposite ends to a pair of struts 129 that include cylinder bearings 130 for slidably mounting carriage 128 on a pair of shafts 131. Shafts 131 are supported at their forward end by struts 124 and at the rearward ends by struts 127.

Figure 9:
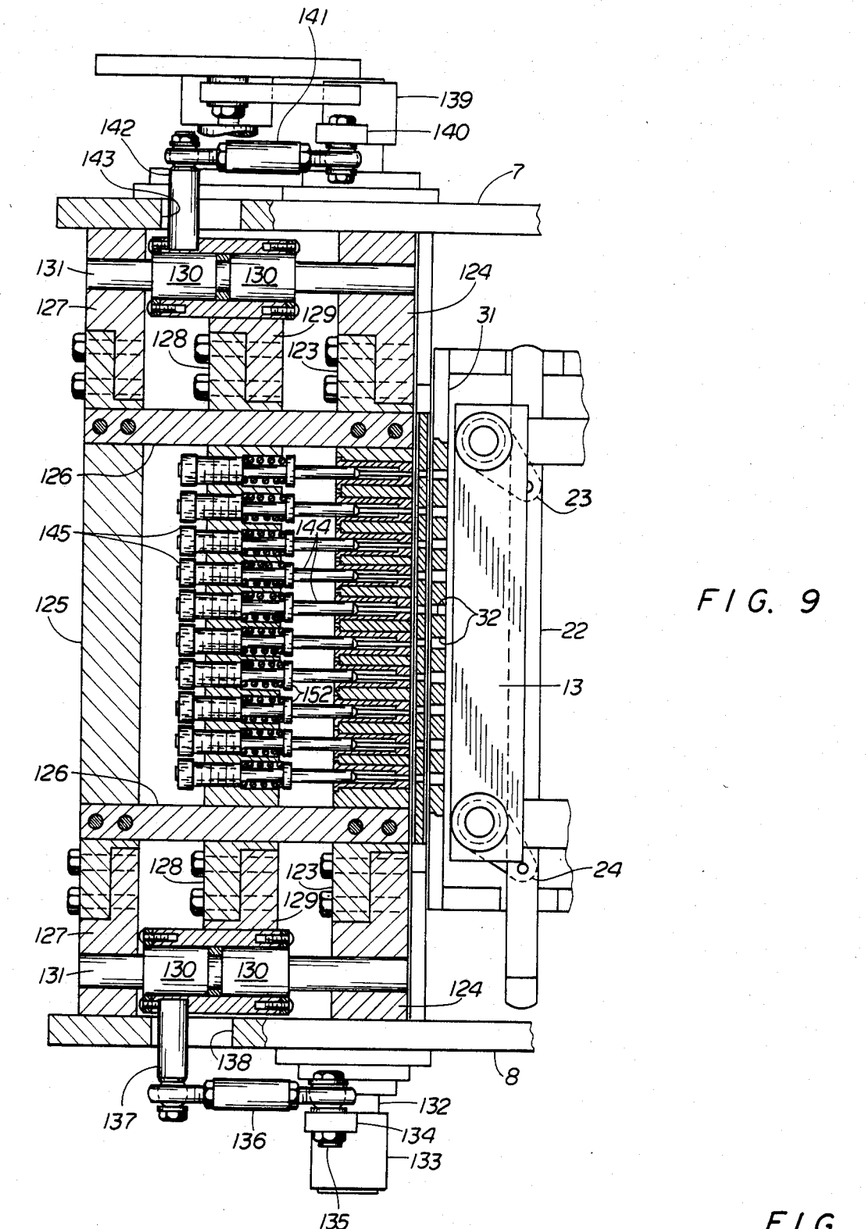
FIG. 9 is a top plan view in section illustrating the can staking station of FIG. 1.

As a means for reciprocating carriage 128 between a first position spaced from the headed ends of wires 1 as shown in FIG. 9, and a second can staking position, station 36 includes a drive shaft 132 having an eccentric 133 mounted thereon which engages one end of a bell crank 134 which is centrally pivoted as at 135. The other end of bell crank 134 is connected to an adjustment link 136 which in turn is connected to a rod 137 that extends through an opening 138 in end wall 8 and is connected to strut 129 of carriage 128. Thus, upon rotation of shaft 132 bell crank 134 pivots to move link 136 and rod 137 to the right which in turn moves carriage 128 to its can staking position. To return carriage 128 to the position shown in FIG. 9, drive shaft 132 is also connected to an eccentric 139 which drives a bell crank 140 that is connected to an adjustment link 141 in a manner similar to bell crank 134 and link 136. Adjustment link 141 in turn is connected to a rod 142 which extends through an opening 143 in end wall 7 and is affixed to strut 129 of carriage 128. Thus, in a manner similar to that described with respect to wire upsetting station 35, eccentrics 133 and 139 are positioned in timed relation to one another so that eccentric 133 moves carriage 128 to the right while eccentric 139 moves carriage 128 to the left as shaft 132 rotates.

Carriage 128 includes ten elongate punches 144 each of which includes a rearward end threadedly engaged in a punch guide member 145 which in turn is threadedly engaged in a bore 146 formed in carriage 128. Thus, movement of carriage 128 causes corresponding movement of punches 144. Each punch 144 includes a forward end of reduced diameter having a counterbore 147 formed in its outer end. Each punch 144 is slidably received within a guide bushing 148 captured within an opening 149 formed in stationary guide bar 123. Guide bushings 148 each include a central bore 150 having a diameter substantially the same as the outer diameter of punch 144 and a bore 151 of reduced diameter for slidably receiving the forward end of each punch 144. Each punch 144 also includes an annular flange 152 intermediate its ends and a spring 153 having one end bearing against flange 152 and its other end bearing against guide member 145.

In operation, carriage 128 of can staking station 36 is moved to the right from the position shown in FIG. 9 so that punches 144 also move to the right. The forward ends of punches 144 fit inside cans 2 to advance cans 2 over the end of lead wires 1 as far as heads 4, and thereafter stakes or rivets the end of lead wires 1 inside cans 2 to form staked end 5. As shown best in FIG. 10, punches 144 engage the bottoms of cans 2 to advance cans 2 through openings 32 in plates 31 so that the bottom openings 3 of each can 2 may pass over the end of wire leads 1. Spring 153 permit overtravel for carriage 128 to insure proper can staking. Carriage 128 and punches 144 are then returned to the position shown in FIG. 9 by further rotation of drive shaft 132 by eccentric 139 as previously described herein.

Figure 10:
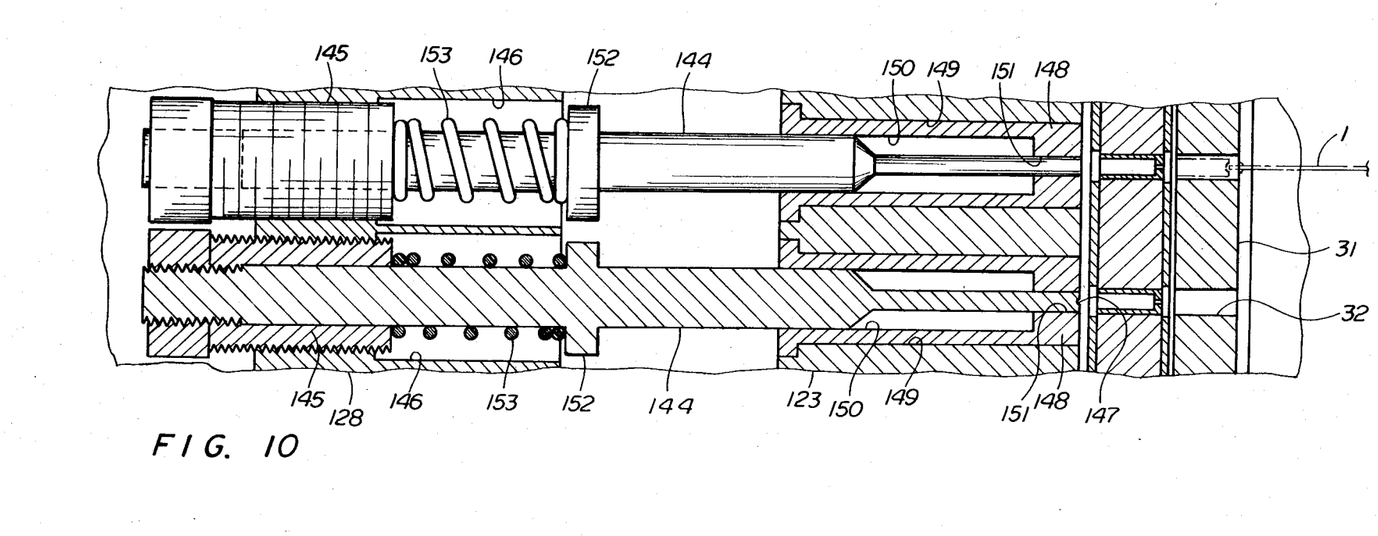
FIG. 10 is a fragmentary detailed view partially in section of two of the can staking punches.
Figure 13:
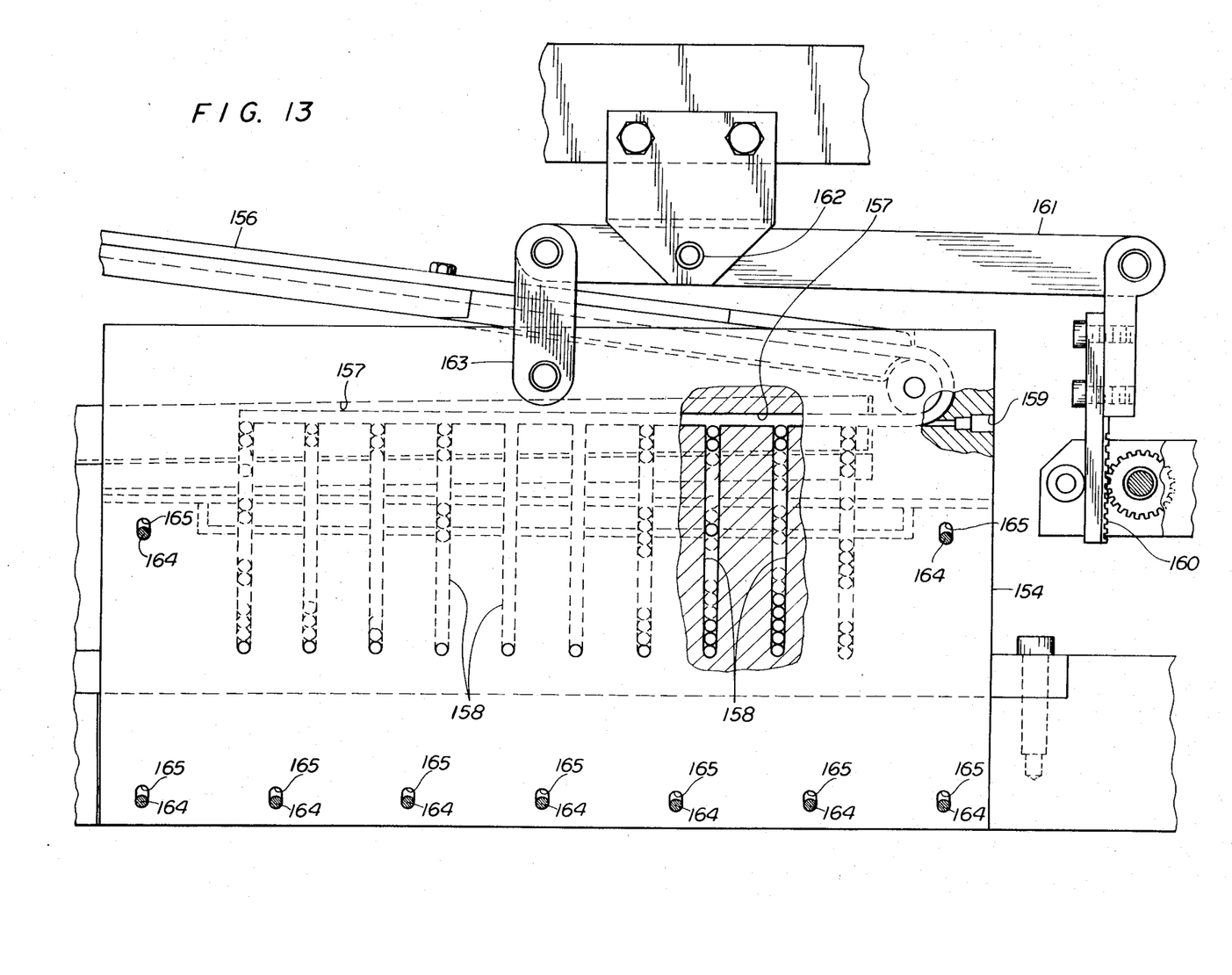
FIG. 13 is a side view in elevation partially in section showing the can magazine for supplying cans to the can staking station of FIG. 9.

Can staking station 36 also includes a can feed magazine 154 for feeding cans to a position between punches 144 and plates 31, as shown in FIGS. 9 and 10. As shown in FIG. 1, cans 2 are loaded into a hopper 155 supported on a vibratory base that orientates cans 2 and insures that all cans 2 are fed with their closed end facing plate 31 and their open end facing punches 144. As shown best in FIG. 13, hopper 155 feeds cans 2 downwardly side by side through a tube 156 to a main can feed slot 157 formed in the upper end of can magazine 154. Slot 157 in turn communicates with ten distribution slits 158 so that as cans are fed into main slot 157 they drop into slots 158 in a stacked arrangement. Th bottommost can 2 and each slot 158 is thus aligned with punches 144 as shown best in FIG. 10. Main feed slot 157 also communicates with air inlet 159 which in turn communicates with a source of air under pressure. Air inlet 159 supplies a jet of air to insure that cans 2 fall into all slots 158. Can magazine 154 may be adjusted in height by means of a rack and pinion 160 connected to one end of a link 161. Link 161 in turn is pivotally mounted as at 162 intermediate its ends and is connected to a rod 163 at the end opposite rack and pinion 160. Rod 163 in turn is connected to can magazine 154 so that as rack and pinion 160 moves can magazine 154 will be raised or lowered accordingly. Magazine 154 is guided in its vertical movement by a plurality of pins 164 that ride in openings 165 formed in the sides of magazine 154.

Referring once again to FIG. 1, after wire leads 1 on spoke 11a have been staked to cans 2, main drive shaft 6 is rotated so that spoke 11a moves clockwise to the second idle station 37 and then to can discharge station 38. At station 38, rotary actuator 16 moves rod 22 from the position shown in FIG. 2 so that clamp plates 12 and 13 are opened or released. At substantially the same time, a blast of air is forced into bore 166 of manifold 167 (see FIG. 1) which communicates with ten air outlets 168 that provides air jets into ten tubes 169. Each tube 169 communicates with an opening 32 of plate 31 so that the air jets exiting outlets 168 draw cans 2 with wire leads 1 now attached through tubes 169 to a remote location for packaging (not shown).

After can discharge, spoke 11a is once again rotated clockwise by shaft 6 to return to the position shown in FIG. 1 so that the wire feeding and upsetting operations as well as the can staking and discharge operations may be repeated.

Figure 11:
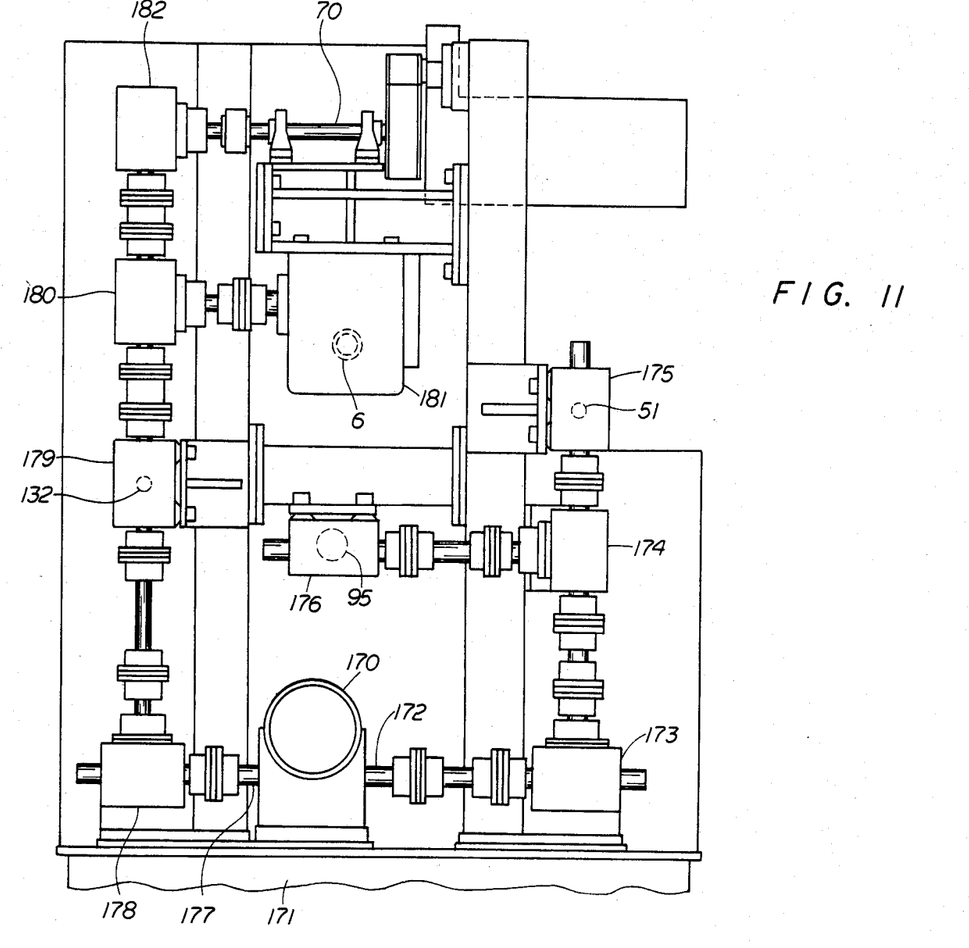
FIG. 11 is an end view illustrating the drive mechanisms for the machine of FIG. 1.

Referring now to FIG. 11, there is shown the drive mechanisms for drive shafts 6, 51, 95, 132 and 70. More particularly, these drive mechanisms include a main motor 170 mounted on machine base 171 having a drive shaft 172 coupled to a gear box 173 which in turn is coupled to another gear box 174. Gear box 174 in turn is coupled to a gear box 175 for driving shaft 51 of wire feed station 33, and also is coupled to a gear box 176 for driving shaft 95 of wire upsetting station 35. Motor 170 also includes a second drive shaft 177 coupled to a gear box 178 which in turn is coupled to another gear box 179. Gear box 179 in turn is coupled to another gear box 180 which in turn is coupled to an index drive 181. Index drive 181 rotates main drive shaft 6 to the six discrete positions described herein and is commercially available from numerous sources, one of which is Commercial Cam & Machine Company. Gear box 180 is also coupled to another gear box 182 which in turn is coupled to drive shaft 70 for cutter 71. Thus, the entire machine is powered by motor 170.

A machine for staking cans to wire leads has been illustrated and described. It is believed that the construction and operation of the machine, as well as the advantages thereof, are apparent from the foregoing detailed description. However, while a preferred form of the invention has been shown and illustrated, various modification and/or substitutions may be made of the specific components described herein without departing from the scope of the invention.

Various modes of carrying out the invention are contemplated as being within the scope of the following claims particularly pointing out and distinctly claiming the subject matter which is regarded as the invention.

I claim:

1. An apparatus for attaching wire leads to cans for housing electrical components, comprising:

holding means mounted for rotation about an axis for receiving and holding a wire lead, said holding means includes a spindle having a hub fixedly mounted to a rotatable shaft and at least one spoke projecting radially outwardly from said hub, and a split die having a pair of opposing clamp plates mounted at the outer end of said spoke;

indexing means for rotatably indexing said holding means to a plurality of work stations;

first punch means at a first of said work stations movable between a first position spaced from an end of a wire lead and a second wire upsetting position;

means for reciprocating said first punch means between its positions to upset and head a wire lead at a location spaced from its end;

second punch means at a second of said work stations movable between a first position spaced from the headed end of a wire lead and a second can staking position;

means for reciprocating said second punch means between its positions to feed a can having a bottom hole over the headed end of a wire lead as far as the head and to stake the end of a wire lead to attach said lead to said can; and release means for releasing said holding means to discharge said can and attached wire lead at a third of said work stations.

2. The apparatus of claim 1, wherein said first punch means includes a movable carriage, a punch member carried by said carriage and projecting therefrom, and stationary guide means for slidably receiving and guiding the projecting end of said punch member.

3. The apparatus of claim 2, further including means for adjusting the position of the projecting end of said punch member with respect to said carriage.

4. The apparatus of claim 2, wherein said punch member includes a surrounding guide member, and said stationary guide means includes a guide bushing having a central bore dimensioned to slidably receive said guide member.

5. The apparatus of claim 4, further including means permitting overtravel for said carriage when said punch member moves to its wire upsetting position.

6. The apparatus of claim 5, wherein said overtravel means includes an annular flange on said guide member and spring means extending between said flange and said carriage.

7. The apparatus of claim 2, wherein said means for reciprocating said first punch means includes first and second cam means disposed in timed relation with respect to one another for moving said carriage between said positions.

8. The apparatus of claim 7, wherein said first and second cam means includes first and second eccentric means both mounted on a common drive shaft.

9. The apparatus of claim 1, wherein said second punch means includes a movable carriage, a punch member carried by said carriage and projecting therefrom, said stationary guide means for slidably receiving and guiding the projecting end of said punch member.

10. The apparatus of claim 9, wherein said stationary guide means includes a guide bushing having a central bore dimensioned to slidably receive said punch member.

11. The apparatus of claim 9, further including means permitting overtravel for said carriage when said punch member moves to its can staking position.

12. The apparatus of claim 11, wherein said overtravel means includes an annular flange on said punch member and spring means extending between said flange and said carriage.

13. The apparatus of claim 1, wherein said first and second punch means are disposed in radial alignment with said spoke when said spoke is rotated to said respective first and second work stations.

14. An apparatus for attaching wire leads to cans for housing electrical components, comprising:

holding means mounted for rotation about an axis for receiving and holding a wire lead;

indexing means for rotatably indexing said holding means to a plurality of work stations;

plunger means at a first of said work stations movable between a first position spaced from said holding means and a second wire feed position;

means for reciprocating said plunger means between its positions to feed a wire lead to said holding means;

means for supplying a wire lead of predetermined length between said plunger means and said holding means when said plunger means moves to its first position;

first punch means at a second of said work stations movable between a first position spaced from an end of a wire lead and a second wire upsetting position;

means for reciprocating said first punch means between its position to upset and head a wire lead at a location spaced from its end;

second punch means at a third of said work stations movable between a first position spaced from the headed end of wire lead and a second can staking position;

means for reciprocating said second punch means between its positions to feed a can having a bottom hole over the headed end of a wire lead as far as the head and to stake the end of a wire lead to attach said lead to said can; and release means for releasing said holding means to discharge said can and attached wire lead at a third of said work stations.

15. The apparatus of claim 14, wherein said plunger means includes a movable carriage, and a plunger member carried by said carriage and projecting therefrom.

16. The apparatus of claim 15, wherein said plunger member includes a finger member having a diameter substantially the same as a wire lead.

17. The apparatus of claim 15, wherein said wire lead supply means includes a wire magazine positioning a wire lead so that its longitudinal axis is substantially parallel to the longitudinal axis of said plunger member.

18. The apparatus of claim 17, wherein said wire magazine includes a reciprocating feed bar having a wire-receiving groove formed therein and movable between a first position wherein a wire lead is loaded in said groove and a second position wherein said loaded wire is in a position aligned with said said plunger member.

19. The apparatus of claim 17, further including a source of continuous wire, a wire straightening means and cutter means for cutting said continuous wire into wire leads of a desired length, said cutting means including chute means for feeding the cut wire leads to said wire magazine.

* * * * *